UNITED STATES PATENT OFFICE.

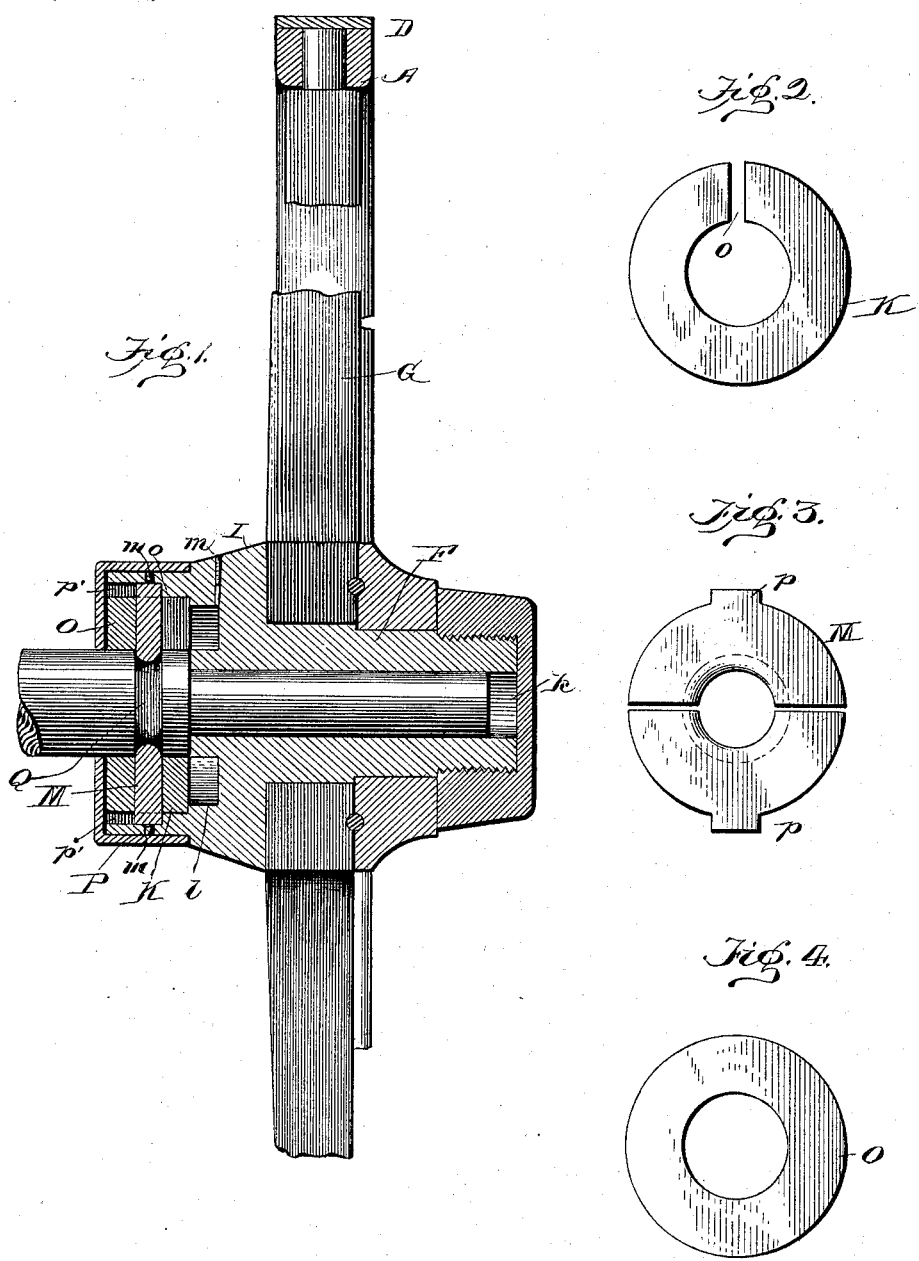

THOMAS M. SHROUT, OF HILLSBOROUGH, KENTUCKY.

VEHICLE-WHEEL.

SPECIFICATION forming part of Letters Patent No. 610,096, dated August 30, 1898.

Application filed November 9, 1897. Serial No. 657,931. (No model.)

*To all whom it may concern:*

Be it known that I, THOMAS M. SHROUT, a citizen of the United States, residing at Hillsborough, in the county of Fleming, State of Kentucky, have invented certain new and useful Improvements in Vehicle-Wheels, of which the following is a description, reference being had to the accompanying drawings, and to the letters of reference marked thereon.

My invention relates to an improvement in vehicle-wheels, and especially to a construction of the hub thereof whereby is formed a simple and effective way of supplying lubricant to the axle and a simple means of taking up the wear due to the friction on the hub of the axle.

The invention consists in the matters hereinafter described, and referred to in the appended claims.

The invention is illustrated in the accompanying drawings, in which—

Figure 1 is a view, partly in section, of a portion of a wheel embodying my invention; and Figs. 2, 3, and 4 are detail views of the washers used in this arrangement.

The invention is illustrated clearly in Fig. 1 and represents a novel arrangement for supplying oil to the axle. A is the felly of the wheel; D, the tire; G, the spokes, and F the hub. The inner side I' of the hub of the wheel is bored out, as shown, and has a central opening $k$, through which the axle passes. In the inner face of the bored-out portion is an annular recess or groove $l$, communicating through an opening $m$ in the hub with the outside, and through this opening oil may be supplied to the groove, which, with the parts now about to be described, form a reservoir for the oil, thus practically making a self-lubricating axle.

K represents a washer fitting over and forming a cover for the annular groove, which washer has an opening $o$, through which oil may pass into the axle.

M represents a two-part washer with projecting portions $p$, which fit grooves $p'$ in the inner side of the hub and prevent rotation of the said washer. The opening through this washer M is of less diameter than the axle, the latter being grooved, as shown at Q, and in this groove the sides of the inner opening of the washer fit.

O represents another washer fitting within the hub, and P is the outer cap placed over the outside of said hub. By this arrangement it will be noticed that a practically dust-proof and self-lubricating bearing for the hub of the axle is provided, and the advantages of the construction will be readily apparent. Furthermore, by this arrangement of the two-part-open washer wear may be taken up by tightening the said two parts around the axle by the set-screws $m$.

Having thus described my invention, what I claim, and desire to secure by Letters Patent, is—

1. In a vehicle-wheel, a hub having an oil-reservoir therein, a washer forming a covering therefor and having an opening to allow the escape of oil to the axle; substantially as described.

2. In a vehicle-wheel, in combination with the hub, having a chamber or reservoir for oil or other lubricant, a washer fitting over said chamber or reservoir, a grooved axle, and a washer having an opening whose edge fits within the groove of said axle; substantially as described.

3. In a vehicle-wheel, in combination with the hub having a chamber or reservoir for oil or other lubricant, a washer or closing-cap for said reservoir having an opening to permit escape of the oil to the axle, a two-part washer embracing the axle, said axle being grooved to receive the edge of the washer, and means for adjusting the parts of the washer to take up wear; substantially as described.

In testimony whereof I affix my signature in presence of two witnesses.

THOMAS M. SHROUT.

Witnesses:
CHAS. E. BOOE,
T. W. KINCAID.